(12) United States Patent
Min

(10) Patent No.: US 11,977,409 B2
(45) Date of Patent: May 7, 2024

(54) DISPLAY DEVICE

(71) Applicant: Samsung Display Co., LTD., Yongin-si (KR)

(72) Inventor: Myungan Min, Cheonan-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 8 days.

(21) Appl. No.: 17/223,117

(22) Filed: Apr. 6, 2021

(65) Prior Publication Data

US 2022/0011815 A1 Jan. 13, 2022

(30) Foreign Application Priority Data

Jul. 9, 2020 (KR) .................. 10-2020-0084585

(51) Int. Cl.
*G06F 1/16* (2006.01)
(52) U.S. Cl.
CPC .......... *G06F 1/1616* (2013.01); *G06F 1/1656* (2013.01)
(58) Field of Classification Search
CPC .... G06F 1/1652; G06F 1/1681; G06F 1/1624; G06F 1/1675; G06F 1/1679
See application file for complete search history.

(56) References Cited

U.S. PATENT DOCUMENTS

| | | | |
|---|---|---|---|
| 2017/0208157 A1* | 7/2017 | Kim | H04M 1/0216 |
| 2018/0101200 A1* | 4/2018 | Myeong | G02F 1/133305 |
| 2018/0190936 A1* | 7/2018 | Lee | B32B 15/04 |
| 2019/0132947 A1* | 5/2019 | Koo | G09F 9/301 |
| 2019/0196548 A1* | 6/2019 | Kim | G09F 9/301 |
| 2019/0204873 A1* | 7/2019 | Kim | H01L 27/323 |
| 2019/0207141 A1* | 7/2019 | Kim | H01L 51/524 |
| 2019/0248102 A1 | 8/2019 | Song et al. | |
| 2020/0319672 A1* | 10/2020 | Kim | G06F 1/1681 |
| 2021/0068276 A1* | 3/2021 | Kim | G06F 1/1652 |
| 2021/0144871 A1* | 5/2021 | Araki | G06F 1/1652 |

FOREIGN PATENT DOCUMENTS

| KR | 1020190049454 A | 5/2019 |
|---|---|---|
| KR | 1020190097340 A | 8/2019 |

\* cited by examiner

*Primary Examiner* — Abhishek M Rathod
(74) *Attorney, Agent, or Firm* — CANTOR COLBURN LLP

(57) ABSTRACT

A display device includes a display panel including a folding area and a non-folding area, and a plate which faces the display panel. The plate includes first surface and a second surface which is opposite to the first surface, and a pattern hole which is defined in the plate and corresponding to the folding area of the display panel. The pattern hole is defined by a side surface of the plate, and a first inclined surface of the plate which connects the first surface and the side surface to each other. With respect to the first surface, the first inclined surface forms a first angle and the side surface forms a second angle, and the first angle of the first inclined surface with respect to the first surface is different from the second angle of the side surface with respect to the first surface.

18 Claims, 7 Drawing Sheets

DISPLAY DEVICE

This application claims priority to Korean Patent Application No. 10-2020-0084585, filed on Jul. 9, 2020, and all the benefits accruing therefrom under 35 U.S.C. § 119, the contents of which are hereby incorporated by reference in its entirety.

BACKGROUND

1. Field

The disclosure relates to a foldable display device.

2. Description of the Related Art

Electronic items, such as a smartphone, a digital camera, a notebook computer, a navigation unit, a smart television, etc., which provide a user with images, include a display device to display the images. The display device generates the images and provides the images to the user through a display screen.

With the development of display device technology, various types of display devices are being developed. For example, various flexible display devices that are foldable or rollable, are being developed. The flexible display devices is easy to transport and improves a user's convenience.

SUMMARY

Embodiments of the invention provide a display device which prevents damage to a protective film and a display panel from folding and unfolding of the display device.

Embodiments of the invention provide a display device including a display panel including a folding area and a non-folding area, and a plate which faces the display panel. The plate includes first surface and a second surface which is opposite to the first surface, and a pattern hole which is defined in the plate and corresponding to the folding area of the display panel. The pattern hole is defined by a side surface of the plate, and a first inclined surface of the plate which connects the first surface and the side surface to each other. With respect to the first surface, the first inclined surface forms a first angle and the side surface forms a second angle, and the first angle of the first inclined surface with respect to the first surface is different from the second angle of the side surface with respect to the first surface.

The first angle may be greater than the second angle.

The pattern hole may include a first width at the side surface of the plate and a second width at the first inclined surface of the plate, and the first width may be equal to or smaller than the second width.

The first width may be constant.

The first width may be in a range from about 100 micrometers to about 200 micrometers.

The second width may increase as a distance from the side surface increases.

The first angle may be in a range from about 120 degrees to about 150 degrees.

The plate may face both the folding area and the non-folding area and have a continuous shape.

The pattern hole may be further defined by a second inclined surface of the plate which connects the second surface and the side surface to each other, with respect to the second surface, the second inclined surface may form a third angle and the side surface may form a fourth angle, and the third angle of the second inclined surface with respect to the second surface may be different from the fourth angle of the side surface with respect to the second surface.

The third angle may be greater than the fourth angle, and the third angle may be equal to the first angle.

The pattern hole may include along the first direction a first width at the side surface which is constant, a second width at the first inclined surface which increases as a distance from the side surface increases, and a third width at the second inclined surface which increases as a distance from the side surface increases.

The second inclined surface may form an internal angle with the second surface which is an obtuse angle.

The display device may further include a protective film which faces the display panel with the pattern hole of the plate therebetween and corresponds to the folding area of the display panel.

The first surface may be closer to the protective film than the second surface, and the first inclined surface may form an internal angle with the first surface which is an obtuse angle.

Embodiments of the invention provide a display device including a display panel including a folding area at which the display panel is foldable, a plate which faces the folding area of the display panel, the plate defining a first surface and a second surface which is opposite to the first surface, a plurality of pattern holes corresponding to the folding area, and an inner side surface extending from the first surface and defining each of the plurality of pattern holes, where the inner side surface includes a chamfered portion of the plate extended from the first surface, and a side surface of the plate extended from the chamfered portion in a direction away from the first surface and a protective film facing the display panel with the folding area of the plate therebetween.

The chamfered portion of the plate may form a first angle with respect to the first surface, the side surface may form a second angle with respect to the first surface, and the second angle may be smaller than the first angle.

Each of the plurality of pattern holes may include a first width at the side surface of the plate, and a second width at the chamfered portion of the plate which is different from the first width and is constant.

Each of the plurality of pattern holes may further include the second width which increases as a distance from the side surface increases.

Each of the plurality of pattern holes may include the second width equal to or greater than the first width.

The first surface of the plate may be closer to the protective film than the second surface of the plate, the chamfered portion of the plate may form an internal angle with the first surface of the plate which is an obtuse angle.

According to one or more embodiment, the pattern holes are defined through the plate, and the corner between one surface of the plate and the side surface defining each pattern hole is chamfered to define the inclined surface. When the display device is folded, the area where the plate is in contact with the protective film or the cushion member increases due to the inclined surface, and the pressure applied to the protective film or the cushion member decreases. Accordingly, damage of the protective film or the cushion member, which occurs due to the repetitive folding and unfolding of the display device, may be reduced or prevented.

BRIEF DESCRIPTION OF THE DRAWINGS

The above and other advantages of the invention will become readily apparent by reference to the following detailed description when considered in conjunction with the accompanying drawings wherein.

DETAILED DESCRIPTION

Figure 1A:
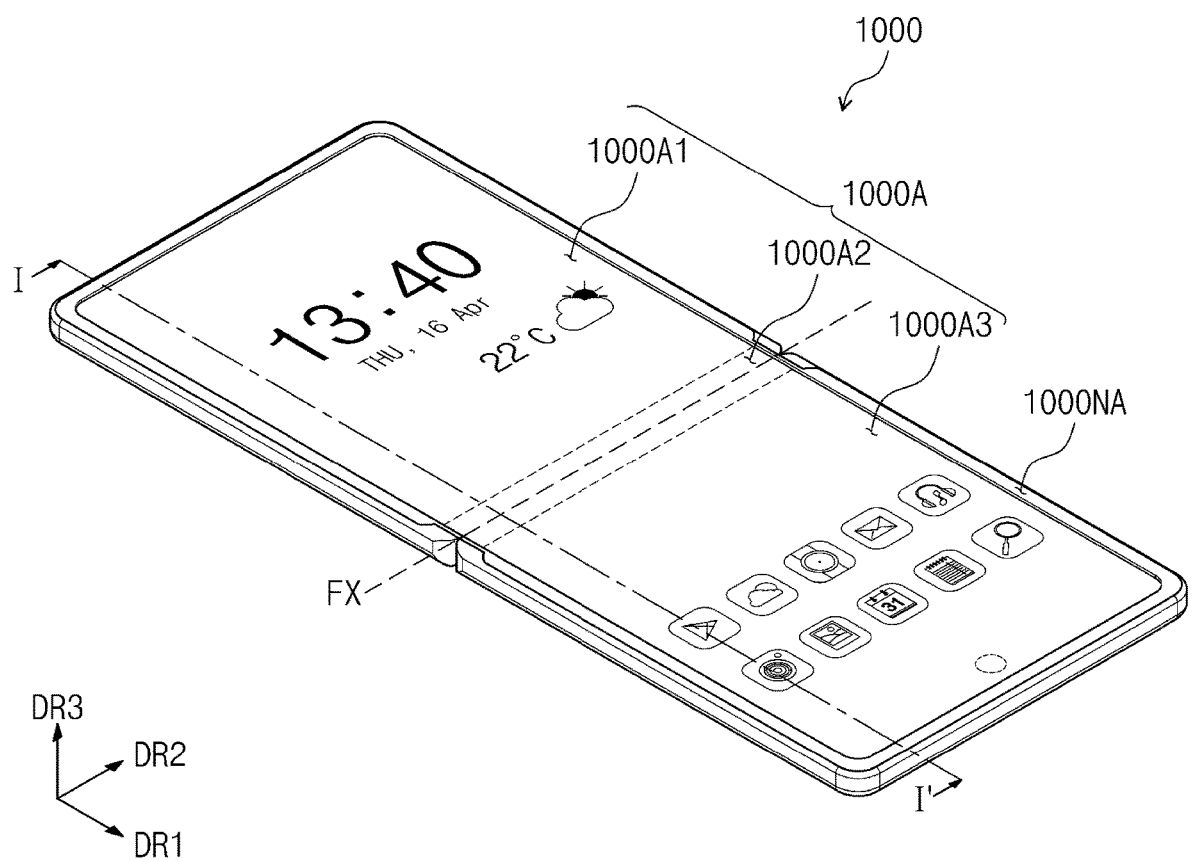
FIGS. 1A and 1B are perspective views showing embodiments of a display device.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like numerals refer to like elements throughout. In the drawings, the thickness, ratio, and dimension of components are exaggerated for effective description of the technical content.

In the disclosure, it will be understood that when an element or layer is referred to as being related to another element such as being "on," "connected to" or "coupled to" another element or layer, it can be directly on, connected or coupled to the other element or layer or intervening elements or layers may be present. In contrast, when an element or layer is referred to as being related to another element such as being "directly on," "directly connected to" or "directly coupled to" another element or layer, no other element or layer or intervening elements or layers are present.

As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present disclosure.

The terminology used herein is for the purpose of describing particular embodiments only and is not intended to be limiting. As used herein, the singular forms, "a." "an" and "the" are intended to include the plural forms as well, unless the context clearly indicates otherwise. For example, "an element" has the same meaning as "at least one element," unless the context clearly indicates otherwise. "At least one" is not to be construed as limiting "a" or "an." "Or" means "and/or."

Spatially relative terms, such as "beneath." "below," "lower," "above," "upper" and the like, may be used herein for ease of description to describe one element or feature's relationship to another element(s) or feature(s) as illustrated in the figures.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will be further understood that the terms "includes" and/or "including." when used in this specification, specify the presence of stated features, integers, steps, operations, elements, and/or components, but do not preclude the presence or addition of one or more other features, integers, steps, operations, elements, components, and/or groups thereof.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments will be explained in detail with reference to the accompanying drawings.

Figure 1B:
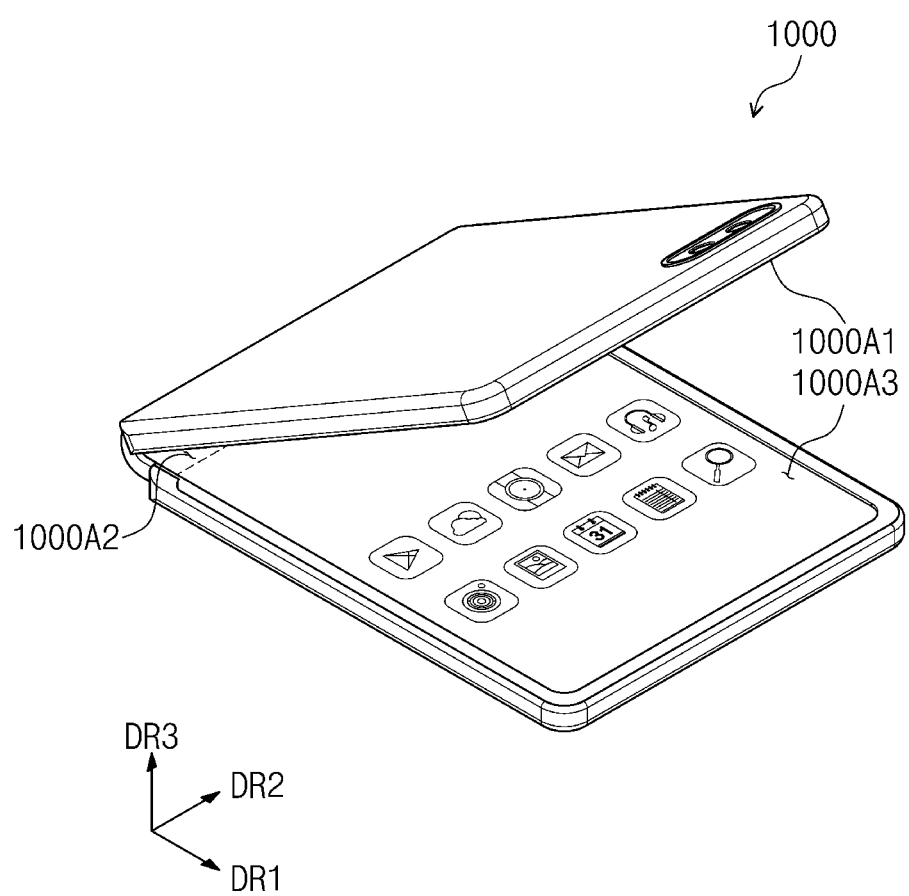

FIGS. 1A and 1B are perspective views showing an embodiment of a display device 1000. FIG. 1A shows the display device 1000 which is unfolded, and FIG. 1B shows the display device 1000 which is folded.

Referring to FIGS. 1A and 1B, the display device 1000 may be an electronic device that is activated in response to electrical signals. The display device 1000 may be applied to a mobile phone, a tablet computer, a car navigation unit, a game unit, or a wearable device, however, should not be limited thereto or thereby. FIG. 1A shows the mobile phone as a representative example of the display device 1000.

The display device 1000 may display an image through an active area 1000A (e.g., display area). The display device 1000 which is unfolded defines the active area 1000A in a plane which is parallel to a plane defined by a first direction DR1 and a second direction DR2 crossing each other. A thickness direction of the display device 1000 may be substantially parallel to a third direction DR3 crossing each of the first direction DR1 and the second direction DR2. Accordingly, front (or upper) and rear (or lower) surfaces of each member of the display device 1000 may be defined with respect to the third direction DR3.

The active area 1000A may include a first area 1000A1, a second area 1000A2 and a third area 1000A3 in order along the active area 1000A. The display device 1000 may be bendable or foldable at the second area 1000A2. The second area 1000A2 may be bendable about a folding axis FX extending along the second direction DR2. Accordingly, the first area 1000A1 and the third area 1000A3 may each be referred to as a non-folding area, and the second area 1000A2 may be referred to as a folding area.

The display device 1000 which is in-folded may dispose the first area 1000A1 and the third area 1000A3 facing each other. Accordingly, in the display device 1000 which is fully folded, the active area 1000A may not be exposed to the outside the display device 1000 which is in-folded. However, this is merely exemplary, and folding or bending of the display device 1000 should not be limited thereto or thereby.

In an embodiment, the display device 1000 which is out-folded may dispose the first area 1000A1 and the third area 1000A3 facing in opposite directions from each other. Accordingly, the active area 1000A may be exposed to outside of the display device 1000 which is out-folded.

The display device 1000 may be only one of in-foldable and out-foldable. The display device 1000 may be both in-foldable and out-foldable. In an embodiment, the second area 1000A2 of the display device 1000 may be inwardly folded (in-foldable) or outwardly folded (out-foldable). In an embodiment, a portion or planar area of the display device 1000 may be inwardly folded (in-foldable), and another portion or planar area of the display device 1000 may be outwardly folded (out-foldable).

FIGS. 1A and 1B show one folding area and two non-folding areas as a representative example, however, the number of the folding areas and the number of the non-folding areas should not be limited thereto or thereby. In an embodiment, for example, the display device 1000 may include three or more non-folding areas and a plurality of folding areas respectively disposed between the non-folding areas adjacent to each other. Various components and layers of the display device 1000 may include a folding area and a non-folding area corresponding to those described above. Components or layers may be foldable and unfoldable together with each other in folding and/or unfolding of the display device 1000.

The display device 1000 may include a peripheral area 1000NA adjacent to the active area 1000A. In an embodiment, the peripheral area 1000NA may surround the active area 1000A, however, should not be limited thereto or thereby. The planar shape of the active area 1000A and the planar shape of the peripheral area 1000NA may be designed relative to each other. The peripheral area 1000NA may be a planar area through which no image is displayed (e.g., non-display area).

FIGS. 1A and 1B show the display device 1000 in which the folding axis FX is substantially parallel to a short axis of the display device 1000, however, should not be limited thereto or thereby. In an embodiment, for example, the folding axis FX may extend to be substantially parallel to a long axis of the display device 1000, e.g., a direction substantially parallel to the first direction DR1. The display device 1000 including the folding axis FX extended along the first direction DR1 may dispose the first area 1000A1, the second area 1000A2 and the third area 1000A3 in order along the second direction DR2.

Figure 2:
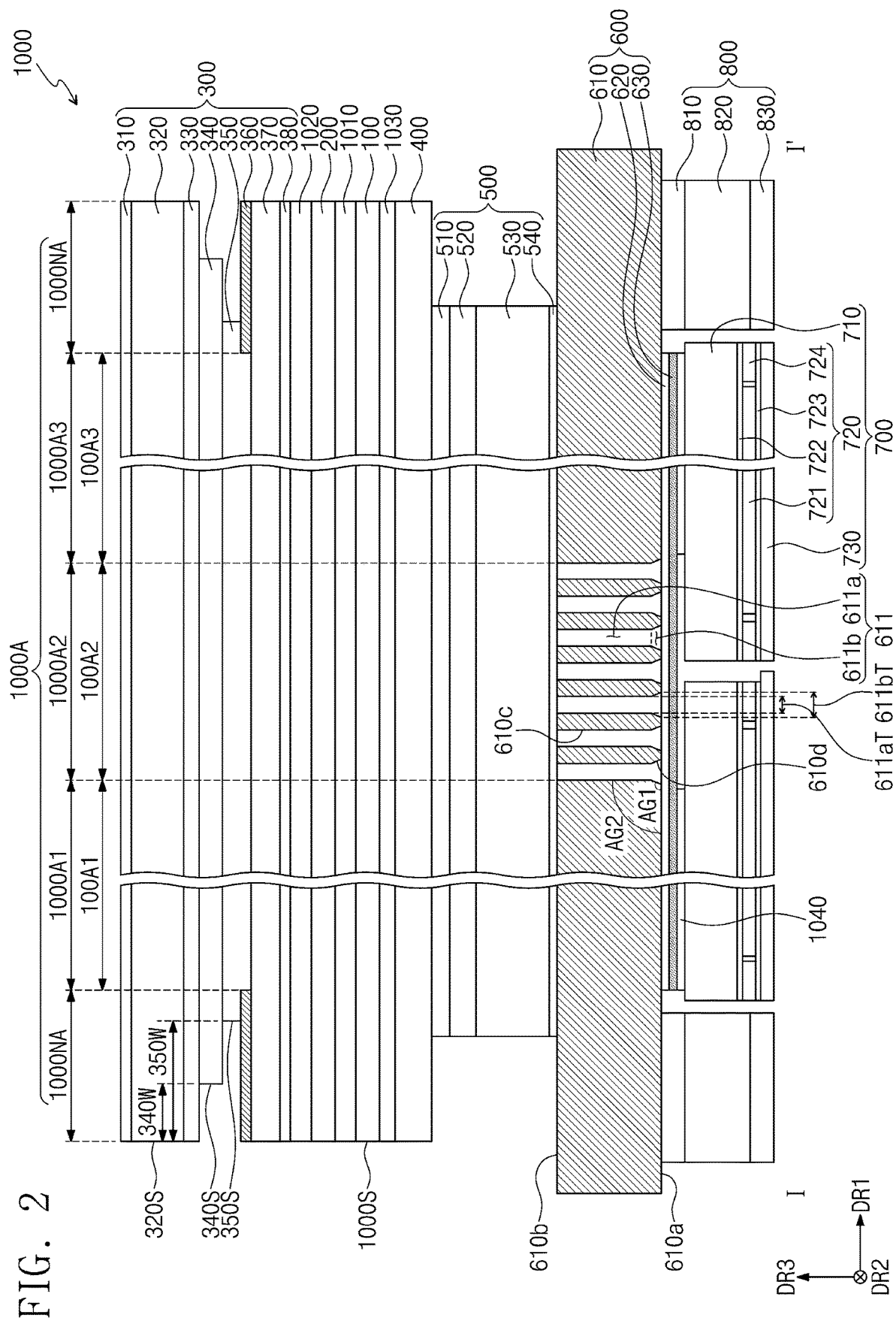
FIG. 2 is a cross-sectional view taken along line I-I' of FIG. 1A.
Figure 3A:
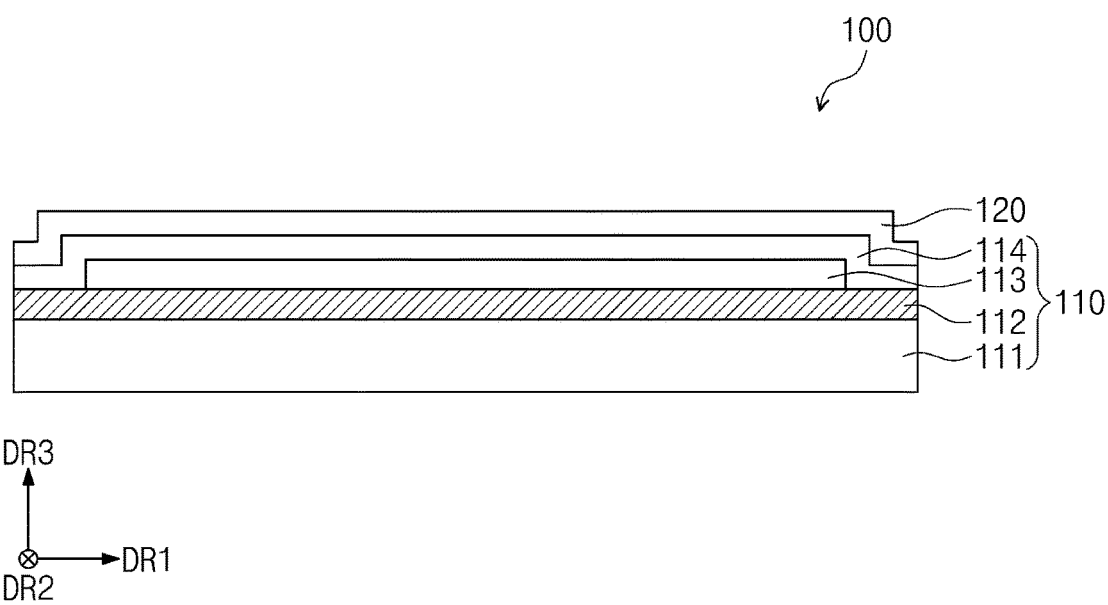
FIG. 3A is a cross-sectional view showing an embodiment of a display panel.

FIG. 2 is a cross-sectional view taken along line I-I' of FIG. 1A to show an embodiment of the display device 1000, and FIG. 3A is a cross-sectional view showing an embodiment of a display panel 100.

Referring to FIG. 2, the display device 1000 may include a display panel 100, upper functional layers and lower functional layers. The upper functional layers may indicate layers disposed above the display panel 100 (e.g., in the third direction DR3) and the lower functional layers may indicate layers disposed under the display panel 100 (e.g., in a direction opposite to the third direction DR3).

The display panel 100 may include a first area 100A1, a second area 100A2 and a third area 100A3 in order. The first area 100A1 may overlap or correspond to the first area 1000A1 of the display device 1000. The second area 100A2 may overlap or correspond to the second area 1000A2 of the display device 1000. The third area 100A3 may be spaced apart from the first area 100A1 along the first direction DR1 with the second area 100A2 interposed therebetween. The third area 100A3 may overlap or correspond to the third area 1000A3 of the display device 1000.

Referring to FIG. 3A, the display panel 100 may generate an image and/or sense an input applied thereto from outside the display panel 100. In an embodiment, for example, the display panel 100 may include a display layer 110 (e.g., image display layer) and a sensor layer 120 (e.g., input sensing layer). The display panel 100 may have a thickness from about 25 micrometers to about 35 micrometers, e.g., about 30 micrometers, however, the thickness of the display panel 100 should not be limited thereto or thereby. The display panel 100 may include at least one folding area. The second area 100A2 of the display panel 100 may be referred to as a folding area of the display panel 100 at which the display panel 100 is foldable.

The display layer 110 may generate the image, generate light, emit light and the like. The display layer 110 may be a light emitting type display layer. In an embodiment, for example, the display layer 110 may be, but not limited to, an organic light emitting display layer, a quantum dot display layer, or a micro-light emitting diode ("LED") display layer.

The display layer 110 may include a base layer 111, a circuit layer 112, a light emitting element layer 113 and an encapsulation layer 114.

The base layer 111 may include a synthetic resin film. The synthetic resin film may include a heat-curable resin. The base layer 111 may have a multi-layer structure. In an embodiment, for instance, the base layer 111 may have a three-layer structure of a synthetic resin layer, an adhesive layer and a synthetic resin layer. In particular, the synthetic resin layer may be a polyimide-based resin layer, however, the material for the synthetic resin layer should not be particularly limited. The synthetic resin layer may include at least one of an acrylic-based resin, a methacrylic-based resin, a polyisoprene, a vinyl-based resin, an epoxy-based resin, a urethane-based resin, a cellulose-based resin, a siloxane-based resin, a polyamide-based resin and a perylene-based resin. The base layer 111 may include a glass substrate or an organic/inorganic composite substrate.

The circuit layer 112 may be disposed on the base layer 111. The circuit layer 112 may include an insulating layer, a semiconductor pattern, a conductive pattern and a signal line. An insulating layer, a semiconductor layer and a conductive layer may be provided or formed on the base layer 111 by a coating or depositing process. The insulating layer, the semiconductor layer and the conductive layer may be selectively patterned by a plurality of photolithography processes. The semiconductor pattern, the conductive pattern and the signal line included in the circuit layer 112 may be provided or formed.

The light emitting element layer 113 may be disposed on the circuit layer 112. The light emitting element layer 113 may include a light emitting element. In an embodiment, for example, the light emitting element layer 113 may include an organic light emitting material, a quantum dot, a quantum rod or a micro-LED.

The encapsulation layer 114 may be disposed on the light emitting element layer 113. The encapsulation layer 114 may include an inorganic layer, an organic layer and an inorganic layer which are sequentially stacked, however, layers included in the encapsulation layer 114 should not be limited thereto or thereby.

The inorganic layers may protect the light emitting element layer 113 from moisture and/or oxygen, and the organic layer may protect the light emitting element layer 113 from a foreign substance such as dust particles. The inorganic layers may include a silicon nitride layer, a silicon oxynitride layer, a silicon oxide layer, a titanium oxide layer or an aluminum oxide layer. The organic layer may include an acrylic-based organic layer, however, should not be limited thereto or thereby.

The sensor layer 120 may be disposed on the display layer 110. The sensor layer 120 may sense an external input applied thereto from outside thereof. In an embodiment, for example, the external input may include a variety of external inputs, such as from a body part, light, heat, pen or pressure.

The sensor layer 120 may be provided or formed on the display layer 110 through successive processes. As being provided by successive processes, the sensor layer 120 is disposed directly on the display layer 110. The expression that a component "B" is disposed directly on a component "A" means that no intervening elements are present between the component "B" and the component "A". That is, a separate adhesive member may not be disposed between the sensor layer 120 and the display layer 110.

The sensor layer 120 as a separately provided component may be subsequently combined with the display layer 110 by an intervening element such as an adhesive member. The adhesive member may include an adhesive material.

Referring to FIG. 2 again, the upper functional layers may be disposed on the display panel 100. In an embodiment, for example, the upper functional layers may include an anti-reflective member 200 and an upper member 300. The upper member 300 may face the display panel 100 with the anti-reflective member 200 therebetween.

The anti-reflective member 200 may reduce a reflectance of an external light incident thereto from outside the display device 1000. The anti-reflective member 200 may include a stretched synthetic resin film. In an embodiment, for example, the anti-reflective member 200 may be provided by dyeing an iodine compound on a polyvinyl alcohol film ("PVA" film). However, this is merely exemplary, and a material for the anti-reflective member 200 should not be limited thereto or thereby. The anti-reflective member 200 may have a thickness of about 25 micrometers, however, the thickness of the anti-reflective member 200 should not be limited thereto or thereby.

The anti-reflective member 200 may be coupled to the display panel 100 by a first adhesive layer 1010. The first adhesive layer 1010 may be a transparent adhesive layer, such as a pressure sensitive adhesive ("PSA") film, an optically clear adhesive ("OCA") film or an optically clear resin ("OCR"). The adhesive layer described hereinafter may include a conventional adhesive. The first adhesive layer 1010 may have a thickness from about 20 micrometers to about 30 micrometers, e.g., about 25 micrometers, however, the thickness of the first adhesive layer 1010 should not be limited thereto or thereby.

In an embodiment, the first adhesive layer 1010 may be omitted such that the anti-reflective member 200 may be disposed directly on the display panel 100. Where the anti-reflective member 200 is directly on the display panel 100, a separate adhesive layer may not be disposed (e.g., may be excluded from) between the anti-reflective member 200 and the display panel 100.

The upper member 300 may be disposed on the anti-reflective member 200. The upper member 300 may include a first hard coating layer 310, a protective layer 320, a first upper adhesive layer 330, a window 340, a second upper adhesive layer 350, a light blocking layer 360 (e.g., light blocking pattern), an impact absorbing layer 370 and a second hard coating layer 380. Components included in the upper member 300 should not be limited thereto or thereby. At least some components among the above-mentioned components may be omitted, and other components may be added.

The first hard coating layer 310 may define an outermost surface of the display device 1000. The first hard coating layer 310 may be provided on the protective layer 320 as a functional layer that improves characteristics of use of the display device 1000. In an embodiment, for example, the first hard coating layer 310 may improve anti-fingerprint characteristics, anti-pollution characteristics, scratch-resistant characteristics and the like.

The protective layer 320 may be disposed under the first hard coating layer 310. The protective layer 320 may protect components disposed thereunder. The first hard coating layer 310 and the anti-fingerprint layer may be additionally provided on the protective layer 320 to improve properties, such as chemical resistance and abrasion resistance. The protective layer 320 may include a film having an elastic modulus equal to or smaller than about 15 GPa (GigaPascal) at room temperature. The protective layer 320 may have a thickness from about 50 micrometers to about 60 micrometers, e.g., about 55 micrometers, however, the thickness of the protective layer 320 should not be limited thereto or thereby. According to an embodiment, the protective layer 320 may be omitted.

The first upper adhesive layer 330 may be disposed under the protective layer 320. The protective layer 320 may be coupled to the window 340 by the first upper adhesive layer 330. The first upper adhesive layer 330 may have a thickness from about 20 micrometers to about 30 micrometers, e.g., about 25 micrometers, however, the thickness of the first upper adhesive layer 330 should not be limited thereto or thereby.

The window 340 may be disposed under the first upper adhesive layer 330. The window 340 may include an optically transparent insulating material. In an embodiment, for example, the window 340 may include a glass substrate or a synthetic resin film.

When the window 340 is the glass substrate, the window 340 may have a thickness equal to or smaller than about 80 micrometers, e.g., about 30 micrometers, however, the thickness of the window 340 should not be limited thereto or thereby.

When the window 340 is the synthetic resin film, the window 340 may include a polyimide ("PI") film or a polyethylene terephthalate ("PET") film.

The window 340 may have a single-layer or multi-layer structure. In an embodiment, for example, the window 340 may include a plurality of synthetic resin films coupled to each other by an adhesive or the glass substrate and the synthetic resin film coupled to the glass substrate by the adhesive.

The second upper adhesive layer 350 may be disposed under the window 340. The window 340 may be coupled to the impact absorbing layer 370 by the second upper adhesive layer 350. The second upper adhesive layer 350 may have a thickness from about 30 micrometers to about 40 micrometers, e.g., about 35 micrometers, however, the thickness of the second upper adhesive layer 350 should not be limited thereto or thereby.

Each of the layers within the display device 1000 may have a sidewall (e.g., outer sidewall) as an outer edge thereof along the first direction DR1 and/or the second direction DR2. According to an embodiment, a first sidewall 340S of the window 340 and a second sidewall 350S of the second upper adhesive layer 350 may be disposed at an inner side as compared to sidewalls of other layers, e.g., a third sidewall 100S of the display panel 100 and a fourth sidewall 320S of the protective layer 320. In the present disclosure, the expression "component A is disposed at an inner side than component B" may mean that the component A is closer to the active area 1000A than the component B.

A positional relationship between the layers may be changed by folding of the display device 1000. According an embodiment, since the first sidewall 340S of the window 340 is disposed at the inner side than the third sidewall 100S of the display panel 100 and the fourth sidewall 320S of the protective layer 320, a probability that the first sidewall 340S of the window 340 protrudes more than the fourth sidewall 320S of the protective layer 320 may be reduced even though the positional relationship between the layers is changed. Accordingly, a probability that external impact is transferred through the first sidewall 340S of the window 340 may be reduced, and a crack occurrence in the window 340 may be reduced.

A first distance 340W between the first sidewall 340S of the window 340 and the fourth sidewall 320S of the protective layer 320 may be equal to or greater than a predetermined distance. In the embodiment, the first distance 340W may be a distance in a direction that is substantially parallel to the first direction DR1. In addition, the first distance 340W may correspond to a distance between the first sidewall 340S and the fourth sidewall 320S when viewed in a plane (e.g., along the third direction DR3).

The first distance 340W may be in a range from about 180 micrometers to about 205 micrometers, e.g., about 196 micrometers, however, should not be limited thereto or thereby. In an embodiment, for example, the first distance 340W may be equal to or greater than about 50 micrometers, such as about 300 micrometers. As the first distance 340W increases, the protective layer 320 may protrude further than the window 340 along the display panel 100, to define an extended portion of the protective layer 320. The extended portion of the protective layer 320 may be bent to be attached to other components, e.g., a case of the display device 1000. In addition, as the planar area of the protective layer 320 increases, a probability that a foreign substance from an upper portion of the protective layer 320 enters a lower portion of the protective layer 320 may be reduced.

In addition, the window 340 and the second upper adhesive layer 350 may be attached to the impact absorbing layer 370 through a lamination process. In consideration of a tolerance of the lamination process, a planar area of each of the window 340 and the second upper adhesive layer 350 may be smaller than a planar area of the impact absorbing layer 370. In addition, the planar area of the second upper adhesive layer 350 may be smaller than the planar area of the window 340. In an embodiment, for example, a pressure may be applied to the second upper adhesive layer 350 during a process of attaching the window 340. The second upper adhesive layer 350 may be elongated in a direction substantially parallel to the first direction DR1 and/or the second direction DR2 due to the pressure applied thereto. To accommodate this elongation, the planar area of the second upper adhesive layer 350 may be smaller than the planar area of the window 340 so that the second upper adhesive layer 350 does not protrude further than an outer edge (or outer sidewall) of the window 340.

In attaching the first upper adhesive layer 330 to the second upper adhesive layer 350, a buckling phenomenon may occur on the window 340 since the window 340 does not slip during the folding of the display device 1000. However, in one or more embodiments, the planar area of the second upper adhesive layer 350 is smaller than the planar area of the window 340. Accordingly, the first upper adhesive layer 330 may not be attached to the second upper adhesive layer 350, and a probability that the foreign substance is adhered to the second upper adhesive layer 350 may be reduced.

A second distance 350W between the second sidewall 350S of the second upper adhesive layer 350 and the fourth sidewall 320S of the protective layer 320 may be equal to or greater than a predetermined distance. In the embodiment, the second distance 350W may be a distance in a direction that is substantially parallel to the first direction DR1. In addition, the second distance 350W may correspond to a distance between the second sidewall 350S and the fourth sidewall 320S when viewed in a plane.

The second distance 350W may be about 392 micrometers, however, should not be limited thereto or thereby. In an embodiment, for example, the second distance 350W may be in a range from about 292 micrometers to about 492 micrometers, however, should not be limited thereto or thereby.

The impact absorbing layer 370 may be a functional layer to protect the display panel 100 from external impacts. The impact absorbing layer 370 may be selected from films having an elastic modulus equal to or greater than about 1 GPa at room temperature. The impact absorbing layer 370 may be a stretched film that includes an optical function. In an embodiment, for example, the impact absorbing layer 370 may be an optical axis control film whose optical axis is controlled. In an embodiment, for example, the impact absorbing layer 370 may be a biaxially stretched PET film. The impact absorbing layer 370 may have a thickness from about 35 micrometers to about 45 micrometers, e.g., about 41 micrometers, however, the thickness of the impact absorbing layer 370 should not be limited thereto or thereby. In an embodiment, the impact absorbing layer 370 may be omitted.

The second hard coating layer 380 may be disposed on a surface of the impact absorbing layer 370. The second hard coating layer 380 may include an organic coating agent, an inorganic coating agent, or a combination of the organic coating agent and the inorganic coating agent and should not be particularly limited as long as haze is reduced thereby. The haze may be defined as a degree to which a light incident into a test member is diffused, and high haze may mean that the light is scattered to cause a blur phenomenon.

The impact absorbing layer 370 may include an uneven surface on upper and/or lower surfaces thereof. The uneven surface may be defined by concave and convex portions. The upper surface of the impact absorbing layer 370 may be in contact with the second upper adhesive layer 350. As being "in contact," elements or layers may form an interface therebetween. Accordingly, the uneven surface of the upper surface of the impact absorbing layer 370 may be filled with the second upper adhesive layer 350. Accordingly, optical issues, e.g., the increase of the haze, may not occur at the upper surface of the impact absorbing layer 370. That is, as the second hard coating layer 380 covers the uneven lower surface of the impact absorbing layer 370, the haze that occurs on the uneven lower surface may be reduced or effectively prevented.

The light blocking layer 360 may be disposed between corresponding ends of the impact absorbing layer 370 and the second upper adhesive layer 350. The light blocking layer 360 may be provided by a printed material layer on an upper surface of the impact absorbing layer 370. The light blocking layer 360 may overlap or correspond to the peripheral area 1000NA. The light blocking layer 360 may be a colored layer or color pattern and may be provided or formed by a coating method. The light blocking layer 360 may include a polymer resin and a pigment which is combined with the polymer resin. The polymer resin may be an acrylic-based resin or polyester, and the pigment may be a carbon-based pigment, however, materials constituting the light blocking layer 360 should not be limited thereto or thereby.

The light blocking layer 360 may be a pattern which is printed after the second hard coating layer 380 is provided or formed on the impact absorbing layer 370. Since the light blocking layer 360 includes a more uneven surface than that of the second hard coating layer 380, an adhesion when the light blocking layer 360 is printed on the impact absorbing layer 370 may be better than that if the light blocking layer 360 is printed on the second hard coating layer 380. That is, as the light blocking layer 360 is directly printed on the uneven surface of the impact absorbing layer 370, separation of the light blocking layer 360 from the second hard coating layer 380 may be reduced or effectively prevented. As described above, since the separation of the light blocking layer 360 from a target printing surface, e.g., the second hard coating layer 380, may be reduced or effectively prevented, reliability of the display device 1000 may be improved.

The upper member 300 may be coupled to the antireflective member 200 by the second adhesive layer 1020. The second adhesive layer 1020 may include a conventional adhesive. The second adhesive layer 1020 may have a thickness from about 20 micrometers to about 30 micrometers, e.g., about 25 micrometers, however, the thickness of the second adhesive layer 1020 should not be limited thereto or thereby.

The lower functional layers may be disposed under the display panel 100. In an embodiment, for example, the lower functional layers may include a lower protective film 400, a cushion member 500, a first lower member 600, a second lower member 700 and a step-difference compensation member 800. The components included in the lower functional layers should not be limited thereto or thereby. At least some components of the above-mentioned components may be omitted or other components may be added as components of the lower functional layers.

The lower protective film 400 may be coupled to a rear surface of the display panel 100 by a third adhesive layer 1030. The lower protective film 400 may reduce or effectively prevent scratches from occurring on the rear surface of the display panel 100 during a manufacturing process of the display panel 100. The lower protective film 400 may be a colored polyimide film. In an embodiment, for example, the lower protective film 400 may be an opaque yellow film, however, should not be limited thereto or thereby.

The cushion member 500 may be disposed under the lower protective film 400. The cushion member 500 may protect the display panel 100 from impacts provided from a lower side of the cushion member 500. An impact resistance of the display device 1000 may be improved by the cushion member 500.

The cushion member 500 may include a first cushion adhesive layer 510, a barrier film 520, a cushion layer 530 and a second cushion adhesive layer 540. Components included in the cushion member 500 should not be limited thereto or thereby. At least some components of the above-mentioned components may be omitted, or other components may be added to the cushion member 500.

The first cushion adhesive layer 510 and the second cushion adhesive layer 540 may include a conventional adhesive. The first cushion adhesive layer 510 may be attached to the lower protective film 400, and the second cushion adhesive layer 540 may be attached to the first lower member 600. The first cushion adhesive layer 510 may have a thickness from about 20 micrometers to about 30 micrometers, e.g., about 25 micrometers. The second cushion adhesive layer 540 may have a thickness from about 4 micrometers to about 15 micrometers, e.g., about 8 micrometers. However, the thickness of the first cushion adhesive layer 510 and the thickness of the second cushion adhesive layer 540 should not be limited thereto or thereby.

The barrier film 520 may be provided to improve impact resistance of the cushion member 500. The barrier film 520 may reduce or effectively prevent deformation of the display panel 100. The barrier film 520 may be a synthetic resin film, e.g., a polyimide film, however, should not be limited thereto or thereby. The barrier film 520 may have a thickness from about 30 micrometers to about 40 micrometers, e.g., about 35 micrometers, however, the thickness of the barrier film 520 should not be limited thereto or thereby.

The cushion layer 530 may include a foam or a sponge. The foam may include a polyurethane foam or a thermoplastic polyurethane foam. When the cushion layer 530 includes the foam, the cushion layer 530 may be provided or formed by using the barrier film 520 as a base member. In an embodiment, for example, the cushion layer 530 may be formed by providing a foaming agent on the barrier film 520.

The cushion layer 530 may have a thickness from about 80 micrometers to about 120 micrometers, e.g., about 100 micrometers, however, the thickness of the cushion layer 530 should not be limited thereto or thereby.

At least one of the barrier film 520 and the cushion layer 530 may have a color that absorbs a light. In an embodiment, for example, at least one of the barrier film 520 and the cushion layer 530 may have a black color. Where the barrier film 520 and/or the cushion layer 530 absorb light, visibility of components disposed under the cushion member 500 from above the cushion member 500 and outside of the display device 1000 may be reduced or effectively prevented.

The first lower member 600 may be disposed under the cushion member 500. The first lower member 600 may include a plate 610, a lower adhesive layer 620 and a protective film 630.

The plate 610 may be disposed corresponding to the first area 100A1, the second area 100A2 and the third area 100A3. The plate 610 may have a continuous shape.

The plate 610 may include a material having an elastic modulus equal to or greater than about 60 GPa at room temperature. In an embodiment, for example, the plate 610 may be SUS304, however, should not be limited thereto or thereby. The plate 610 may support components disposed thereon. In addition, a heat dissipation performance of the display device 1000 may be improved by the plate 610 which functions as a heat dissipation member.

The plate 610 may be provided with a pattern hole 611 provided in plural including a plurality of pattern holes 611 defined through a thickness of the plate 610. The pattern holes 611 may be defined to overlap or correspond to the second area 1000A2. When viewed in a plane, the pattern holes 611 may overlap the second area 1000A2. A shape of a portion of the plate 610 may be easily changed due to the pattern holes 611 defined in the second area 1000A2.

The plate 610 may include a first surface 610*a*, a second surface 610*b*, a side surface 610*c* and a first inclined surface 610*d*. The first surface 610*a* may face the protective film 630 and be furthest from the display panel 100. That is, the protective film 630 is facing the display panel 100 with the plate 610 therebetween. The second surface 610*b* may be opposite to the first surface 610*a* and may face the cushion member 500 to be closest to the display panel 100 among the first surface 610*a* and the second surface 610*b*.

The side surface 610*c* may define the pattern holes 611. At the pattern hole 611, the first inclined surface 610*d* may connect the side surface 610*c* which is flat and the first surface 610*a* to each other. The first inclined surface 610*d* may be provided by chamfering a corner or edge of the plate 610 at which the first surface 610*a* and the side surface 610*c* are connected to each other. The pattern hole 611 may be open at one or both surfaces among the first surface 610*a* and the second surface 610*b*. In an embodiment, the plate 610 may include an inner side surface extending from the first surface 610*a* and defining each of the plurality of pattern holes 611 where the inner side surface includes a chamfered portion (e.g., first inclined surface 610*d*) of the plate 610 extended from the first surface 610*a*, and a side surface 610*c* of the plate 610 extended from the chamfered portion in a direction away from the first surface 610*a*.

A first angle AG1 may be an internal angle of the first inclined surface 610*d* with respect to the first surface 610*a*. A second angle AG2 may be an internal angle of the side surface 610*c* with respect to the first surface 610*a*. The first angle AG1 and the second angle AG2 may be different from each other.

The first angle AG1 may be greater than the second angle AG2. The first angle AG1 may be an obtuse angle. That is, the chamfered portion of the plate 610 forms a first angle AG1 with respect to the first surface 610*a*, the side surface 610*c* of the plate 610 forms a second angle AG2 with respect to the first surface 610*a*, and the second angle AG2 is smaller than the first angle AG1. The first angle AG1 may be in a range from about 120 degrees to about 150 degrees. In an embodiment, for example, the first angle AG1 may be about 135 degrees. The second angle AG2 may be about 90 degrees, however, this is merely exemplary. The first angle AG1 and the second angle AG2 should not be limited thereto or thereby.

A first hole portion 611*a* and a second hole portion 611*b* may be defined in each of the pattern holes 611. The first hole portion 611*a* may be defined by the side surface 610*c* which is flat. The second hole portion 611*b* may be defined by the first inclined surface 610*d* which is inclined relative to the side surface 610*c*.

A first width 611*a*T along the first direction DR1 of the first hole portion 611*a* may be equal to or smaller than a second width 611*b*T along the first direction DR1 of the second hole portion 611*b*.

The first width 611*a*T may be constant along a length of the first hole portion 611*a*. That is, each of the plurality of pattern holes 611 includes a first width 611*a*T at the side surface 610*c* of the plate 610, a second width 611*b*T at the chamfered portion of the plate 610, and the first width 611*a*T is constant. The first width 611*a*T may be in a range from about 100 micrometers to about 200 micrometers. In an embodiment, for example, the first width 611*a*T may be about 150 micrometers.

The second width 611*b*T may increase as a distance from the first hole portion 611*a* increases and a distance to the protective film 630 decreases. That is, each of the plurality of pattern holes 611 may include the second width 611*b*T which increases as a distance from the side surface 610*c* increases.

The protective film 630 may be attached to the plate 610 by the lower adhesive layer 620. The protective film 630 may be attached to the first surface 610*a* by the lower adhesive layer 620 and may not be attached (e.g., unattached) to the first inclined surface 610*d*. The lower adhesive layer 620 may include a conventional adhesive. That is, the lower adhesive layer 620 remains outside of the pattern hole 611 at the first inclined surface 610*d*. The protective film 630 may overlap or correspond to a portion of the first area 100A1 and a portion of the second area 100A2. The protective film 630 may cover or extend across the pattern holes 611 of the plate 610. Accordingly, entry of foreign substances into the pattern holes 611 may be reduced or effectively prevented.

The protective film 630 may include a material having an elastic modulus smaller than an elastic modulus of the plate 610. In an embodiment, for example, the protective film 630 may include a thermoplastic polyurethane, however, this is merely exemplary, and materials for the protective film 630 should not be limited thereto or thereby. The plate 610 may have a thickness from about 120 micrometers to about 180 micrometers, e.g., about 150 micrometers. The lower adhesive layer 620 may have a thickness from about 4 micrometers to about 15 micrometers, e.g., about 8 micrometers. The protective film 630 may have a thickness from about 4 micrometers to about 15 micrometers, e.g., about 8 micrometers. However, the thickness of the plate 610, the thickness of the lower adhesive layer 620 and the thickness of the protective film 630 should not be limited thereto or thereby.

The second lower member 700 may be provided in plural including a plurality of second lower members 700. Each of the second lower members 700 may be attached to the first lower member 600 by a fourth adhesive layer 1040. The fourth adhesive layer 1040 may be provided in plural including fourth adhesive layers 1040. In an embodiment, for example, one of the fourth adhesive layer 1040 may be attached to a lower surface of the first lower member 600 at the first area 100A1, and the other one of the fourth adhesive layer 1040 may be attached to a lower surface of the first lower member 600 at the third area 100A3. That is, the fourth adhesive layers 1040 may not overlap the second area 100A2 and may be excluded from the second area 100A2. The fourth adhesive layers 1040 may be patterns which are disconnected from each other at the second area 100A2. Each of the fourth adhesive layers 1040 may have a thickness from about 8 micrometers to about 15 micrometers, e.g., about 8 micrometers, however, the thickness of each of the fourth adhesive layers 1040 should not be limited thereto or thereby.

Although not shown in figures, a step-difference compensation pattern may be further disposed between each of the second lower members 700 and the first lower member 600. In an embodiment, for example, the step-difference compensation pattern may be disposed in an area overlapping or corresponding to the second area 100A2. One surface of the step-difference compensation pattern may have an adhesive force smaller than an adhesive force of the other surface which is opposite to the one surface of the step-difference compensation pattern. In an embodiment, for example, the one surface may not have an adhesive force. The one surface which has the smaller adhesive force may face the first lower member 600.

Each of the second lower members 700 may include a lower plate 710, a heat dissipation sheet 720 and an insulating film 730. Components included in each of the second lower members 700 should not be limited thereto or thereby. At least some components of the above-mentioned components may be omitted, or other components may be added to the second lower members 700.

The lower plate 710 may be provided in plural including lower plates 710. One lower plate of the lower plates 710 may be disposed to overlap or correspond to the first area 100A1 and a portion of the second area 100A2, and the other lower plate of the lower plates 710 may be disposed to overlap or correspond to the third area 100A3 and the other portion of the second area 100A2.

The lower plates 710 may be disposed to be spaced apart from each other at the second area 100A2. That is, the lower plates 710 are disconnected from each other at the second area 100A2. However, the lower plates 710 may be disposed as close as possible to each other within the second area 100A2 to support a planar area where the plurality of pattern holes 611 of the plate 610 is provided. In an embodiment, for example, the lower plates 710 may reduce or effectively prevent deformation or sagging of the planar area where the plurality of pattern holes 611 of the plate 610 is provided or formed due to a pressure applied thereto from above of the lower plates 710.

In addition, the lower plates 710 may reduce or effectively prevent the components disposed on the second lower members 700 from being deformed due to the components disposed under the second lower members 700.

Each of the lower plates 710 may include a metal alloy, and in detail, each of the lower plates 710 may include a copper alloy. However, the material constituting the lower plates 710 should not be limited thereto or thereby. Each of the lower plates 710 may have a thickness from about 60 micrometers to about 100 micrometers, e.g., about 80 micrometers, however, the thickness of the lower plates 710 should not be limited thereto or thereby.

The heat dissipation sheet 720 may be attached to a lower portion of the lower plate 710. The heat dissipation sheet 720 may be a heat conductive sheet having high thermal conductivity. In an embodiment, for example, the heat dissipation sheet 720 may include a heat dissipation layer 721, a first heat dissipation adhesive layer 722, a second heat dissipation adhesive layer 723 and a gap tape 724.

The gap tape 724 may be attached to the first heat dissipation adhesive layer 722 and the second heat dissipation adhesive layer 723 which is spaced apart from the first heat dissipation adhesive layer 722 with the heat dissipation layer 721 disposed therebetween. The gap tape 724 may include a plurality of layers. In an embodiment, for example, the gap tape 724 may include a base member, an upper adhesive layer disposed on an upper surface of the base member, and a lower adhesive member disposed on a lower surface of the base member.

The heat dissipation layer 721 may be attached to the lower plate 710 by the first heat dissipation adhesive layer 722. The heat dissipation layer 721 may be sealed by the first heat dissipation adhesive layer 722, the second heat dissipation adhesive layer 723 and the gap tape 724. The heat dissipation layer 721 may be a graphitized polymer film. The polymer film may be, for example, a polyimide film. Each of the first heat dissipation adhesive layer 722 and the second heat dissipation adhesive layer 723 may have a thickness from about 3 micrometers to about 8 micrometers, e.g., about 5 micrometers. Each of the heat dissipation layer 721 and the gap tape 724 may have a thickness from about 10 micrometers to about 25 micrometers, e.g., about 17 micrometers. However, the thickness of each of the first heat dissipation adhesive layer 722, the second heat dissipation adhesive layer 723, the heat dissipation layer 721 and the gap tape 724 should not be limited thereto or thereby.

The insulating film 730 may be attached to a lower portion of the heat dissipation sheet 720. In an embodiment, for example, the insulating film 730 may be attached to the second heat dissipation adhesive layer 723. The insulating film 730 may reduce or effectively prevent a rattle from being generated in the display device 1000. The insulating film 730 may have a thickness of about 15 micrometers, however, should not be limited thereto or thereby.

The step-difference compensation member 800 may be attached to a lower portion of the plate 610. In an embodiment, for example, the lower adhesive layer 620 may be attached to a first area portion of the lower portion of the plate 610, and the step-difference compensation member 800 may be attached to a second area portion of the lower portion of the plate 610 which is further from the second area 100A2 than the first area portion. The step-difference compensation member 800 may be coplanar with the second lower members 700.

The step-difference compensation member 800 may include a first compensation adhesive layer 810, a step-difference compensation film 820 and a second compensation adhesive layer 830. The first compensation adhesive layer 810 may be attached to a lower surface of the plate 610. The step-difference compensation film 820 may be a synthetic resin film. The second compensation adhesive layer 830 may be attached to a lower surface of the step-difference compensation film 820 and a set (not shown). Each of the first compensation adhesive layer 810 and the second compensation adhesive layer 830 may have a thickness from about 13 micrometers to about 25 micrometers, e.g., about 17 micrometers. However, the thickness of each of the first compensation adhesive layer 810 and the second compensation adhesive layer 830 should not be limited thereto or thereby. The step-difference compensation film 820 may have a thickness determined by the thickness of each of the first compensation adhesive layer 810 and the second compensation adhesive layer 830.

Figure 3B:
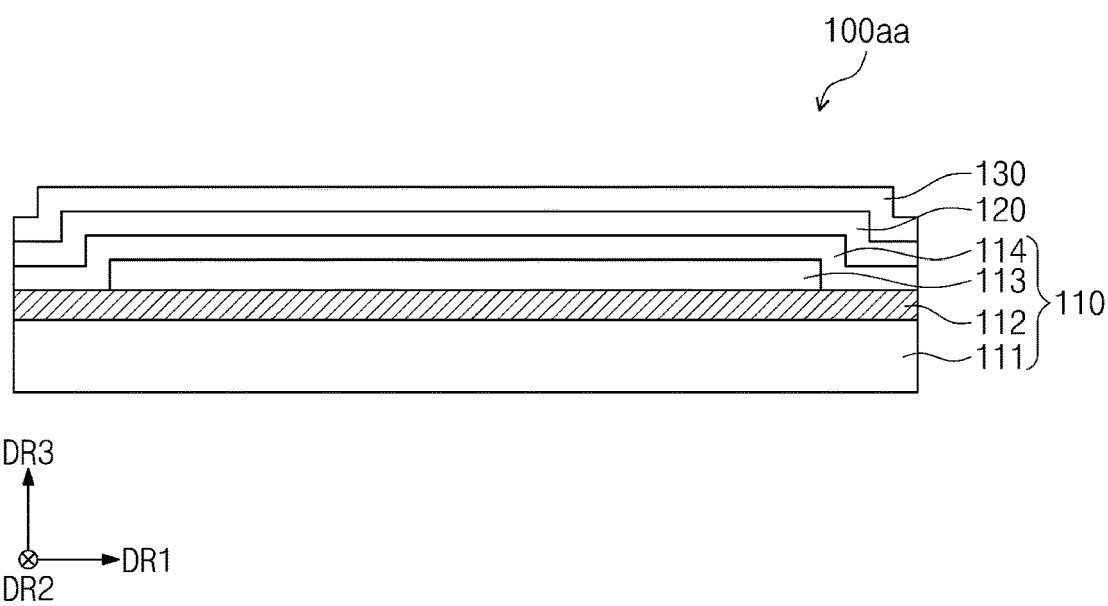
FIG. 3B is a cross-sectional view showing an embodiment of a display panel.

FIG. 3B is a cross-sectional view showing an embodiment of a display panel 100*aa*.

In FIG. 3B, the same reference numerals denote the same elements in FIG. 3A, and thus, detailed descriptions of the same elements will be omitted.

Referring to FIG. 3B, the display panel 100*aa* may further include an anti-reflective layer 130 when compared with the display panel 100 described with reference to FIG. 3A. In this case, the anti-reflective member 200 (refer to FIG. 2) and the first adhesive layer 1010 (refer to FIG. 2) may be omitted from the display device 1000 (refer to FIG. 2) which includes the display panel 100*aa*.

The display panel 100*aa* may include a display layer 110, a sensor layer 120 and the anti-reflective layer 130.

The anti-reflective layer 130 may include a plurality of color filters. The color filters may be arranged in a predetermined arrangement. The arrangement of the color filters may be determined by taking into account emission colors of pixels included in the display layer 110. In addition, the anti-reflective layer 130 may further include a black matrix adjacent to the color filters.

The anti-reflective layer 130 may include a destructive interference structure. In an embodiment, for instance, the destructive interference structure may include a first reflective layer and a second reflective layer which is disposed in a layer different from a layer on which the first reflective layer is disposed. A first reflective light and a second reflective light, which are respectively reflected from the first reflective layer and the second reflective layer, may destructively interfere with each other, and thus, the reflectance of the external light may be reduced.

Figure 4:
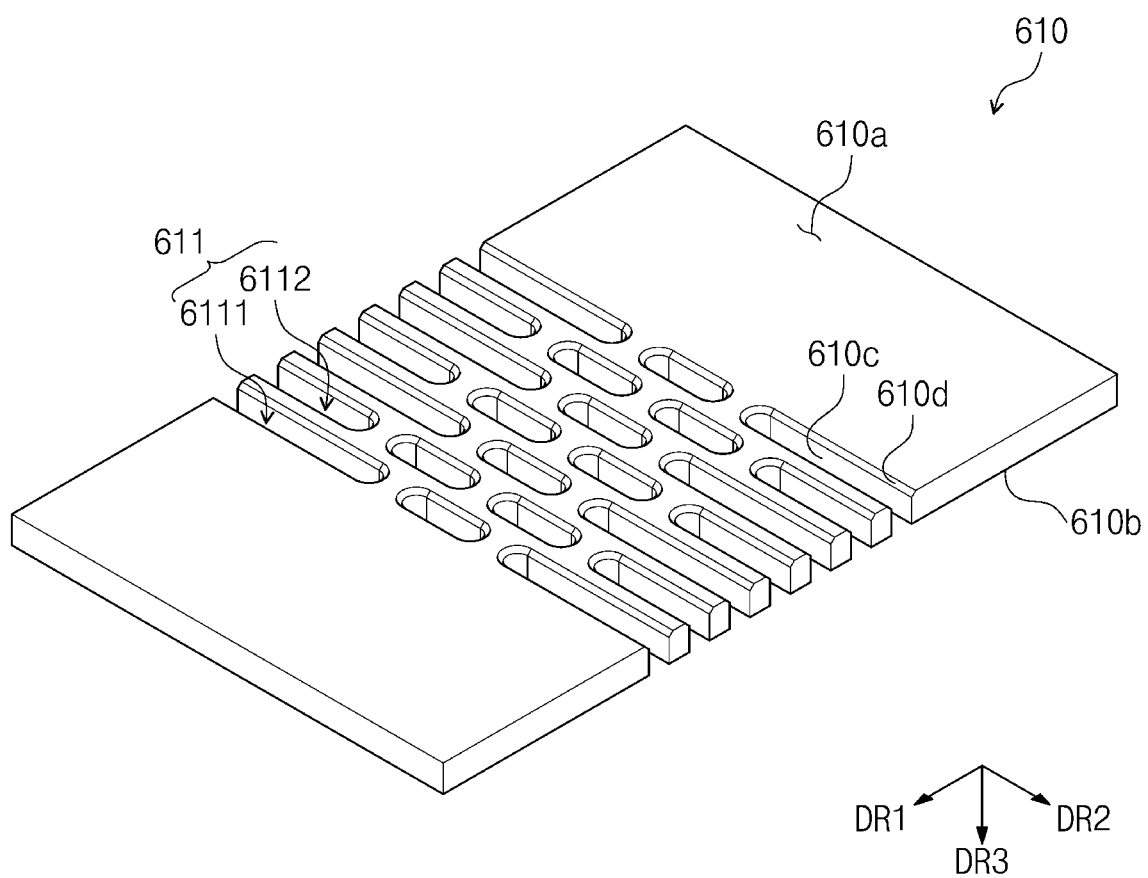
FIG. 4 is a perspective view showing an embodiment of a plate.

FIG. 4 is a perspective view showing an embodiment of the plate 610. In FIG. 4, the same reference numerals denote the same elements in FIG. 2, and thus, detailed descriptions of the same elements will be omitted.

Referring to FIG. 4, the pattern holes 611 may include a plurality of first holes 6111 and a plurality of second holes 6112. Each of the first holes 6111 and the second holes 6112 may have a major dimension along the second direction DR2 and a minor dimension along the first direction DR1. The pattern hole 611 may be an enclosed opening defined by portions of the plate 610. The pattern hole 611 may be open at an edge of the plate 610 which extends along the first direction DR1.

Each of the first holes 6111 may extend along the second direction DR2, and the first holes 6111 may be spaced apart from each other along the second direction DR2. Each of the second holes 6112 may extend along the second direction DR2, and the second holes 6112 may be spaced apart from each other along the second direction DR2. The second holes 6112 may be spaced apart from the first holes 6111 along the first direction DR1.

The first holes 6111 may be alternately defined with the second holes 6112 in the first direction DR1. First holes 6111 which are arranged spaced apart along the second direction DR2 may form a pattern hole group (e.g., a first pattern hole group). Similarly, second holes 6112 which are arranged spaced apart along the second direction DR2 may also form a pattern hole group (e.g., second pattern hole group). A plurality of first pattern hole groups and a plurality of second pattern hole groups may alternate with each other along the first direction DR1.

When viewed in a plane, the first holes 6111 and the second holes 6112 may be defined in a zigzag shape or staggered along the second direction DR2.

Figure 5:
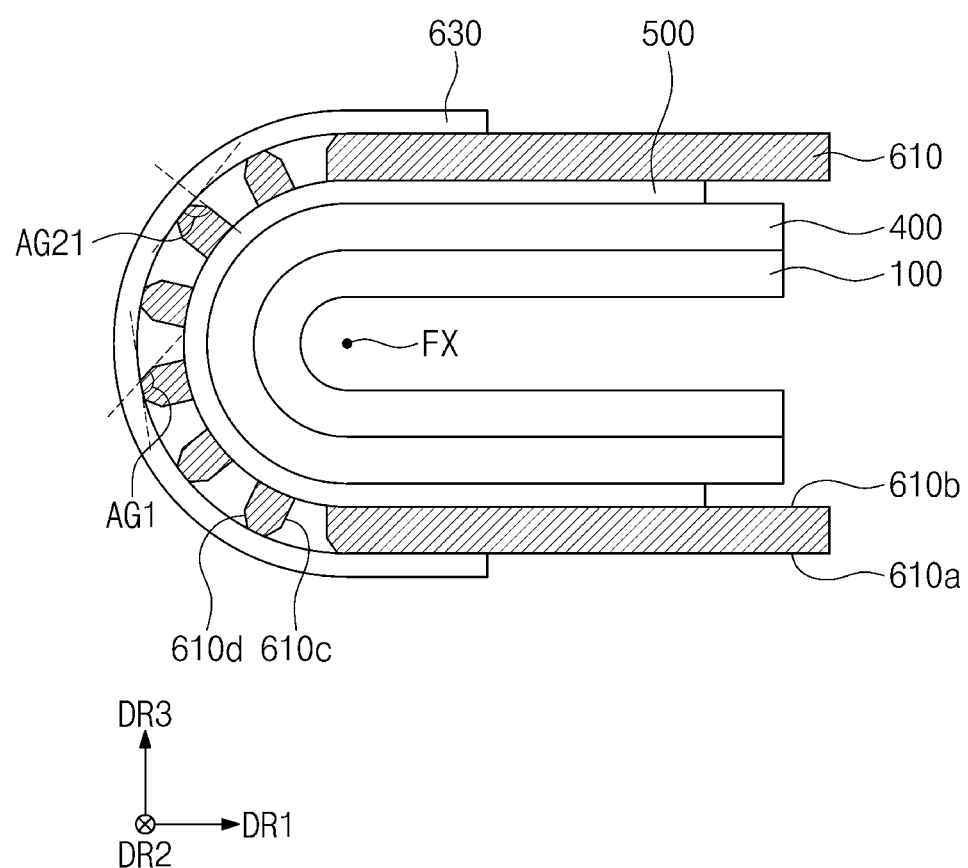
FIG. 5 is a cross-sectional view showing an embodiment of a display device which is folded.

FIG. 5 is a cross-sectional view showing a portion of the display device 1000 which is folded.

Referring to FIG. 5, the display panel 100, the lower protective film 400, the cushion member 500, the plate 610 and the protective film 630 may be folded together with each other about the folding axis FX.

A plate 610 of a comparative display device does not include the first inclined surface 610*d* and the side surface 610*c* extends to the first surface 610*a* of the plate 610. An intersection line may be obtained by extending the side surface 610*c* to meet the protective film 630 at an intersection point. The intersection point may coincide with a corner of the plate 610 where the first surface 610*a* is connected to the side surface 610*c*. A tangent line relative to the protective film 630 may be defined at the intersection point. An intersection surface of the protective film 630 may be extended along the second direction DR2 at the corner. The intersection surface may correspond to a planar area of the first surface 610*a* including a dimension along the second direction DR2. A first comparison angle AG21 between the intersection line of the side surface 610*c* and the tangent line may be an acute angle or a right angle. In an embodiment, for example, the first comparison angle AG21 may be about 90 degrees.

When the comparative display device (refer to FIG. 2) is folded, a first pressure may be applied to the protective film 630 along the intersection surface such as being concentrated from the corner and along a planar area of the first surface 610*a*. The protective film 630 may be damaged by the first pressure, such as being torn by the first pressure and/or foreign substances entering into the plate 610 and the display panel 100 through the protective film 630 which is torn.

However, in one or more embodiment of the display device 1000, the plate 610 does include the first inclined surface 610*d* which extends to the first surface 610*a*. An intersection line may be obtained by extending the first inclined surface 610*d* to meet the protective film 630 at an intersection point. The intersection point may coincide with a corner of the plate 610 where the first surface 610*a* is connected to a distal end of the first inclined surface 610*d*. A tangent line relative to the protective film 630 may be defined at the intersection point. An intersection surface of the protective film 630 may be extended along the second direction DR2 at the corner. An angle between intersection line of the first inclined surface 610*d* and the tangent line may be the first angle AG1. The first angle AG1 may be an obtuse angle. The first angle AG1 may be in a range from about 120 degrees to about 150 degrees, for example, about 135 degrees.

When the display device 1000 (refer to FIG. 2) is folded, a second pressure may be applied to the protective film 630 at the corner such as being distributed from the corner and along both a first planar area of the first inclined surface 610*d* and a second planar area of the first surface 610*a*. Since a total planar area (e.g., first planar area plus second planar area) where the plate 610 is in contact with the protective film 630 increases, the second pressure may be smaller than the first pressure. The protective film 630 may not be damaged by the second pressure. Accordingly, damage of the protective film 630 which occurs due to the repetitive folding and unfolding of the display device 1000 (refer to FIG. 2) may be reduced or effectively prevented.

Figure 6:
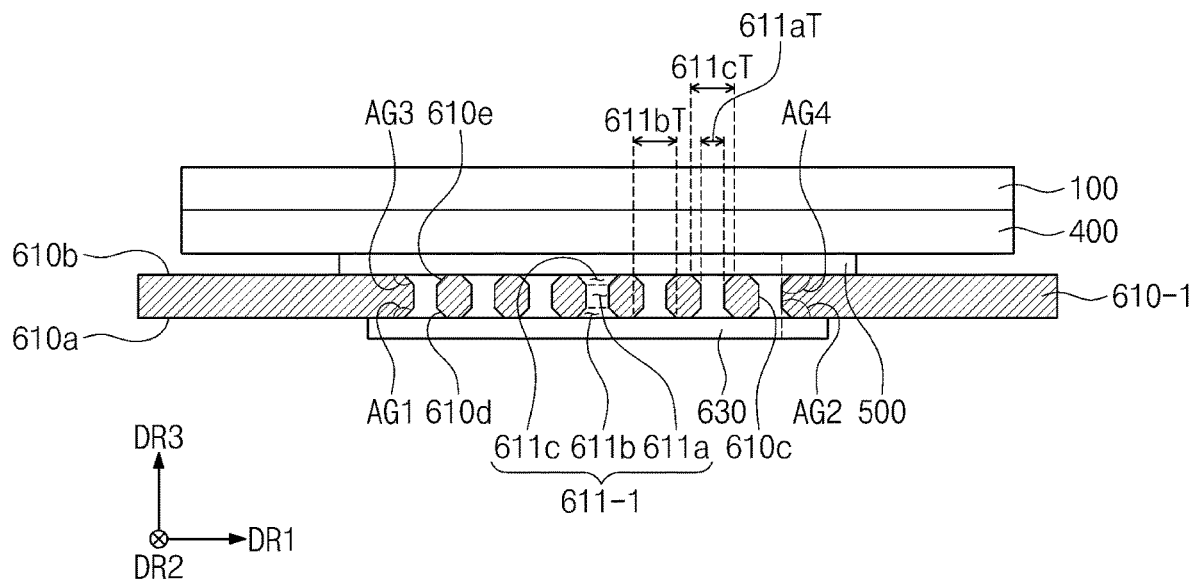
FIG. 6 is a cross-sectional view showing an embodiment of a display device which is unfolded.

FIG. 6 is a cross-sectional view showing an embodiment of a display device 1000 which is unfolded. In FIG. 6, the same reference numerals denote the same elements in FIG. 2, and thus, detailed descriptions of the same elements will be omitted.

Referring to FIG. 6, a pattern hole 611-1 may be provided in plural including a plurality of pattern holes 611-1 may be defined through a portion of a plate 610-1. Due to the pattern holes 611-1, the portion of the plate 610-1 may be easily changed in shape.

The plate 610-1 may include a first surface 610*a*, a second surface 610*b*, a side surface 610*c*, a first inclined surface 610*d* and a second inclined surface 610*e*. The second inclined surface 610*e* may connect the side surface 610*c* and the second surface 610*b* to each other. In an embodiment, the second inclined surface 610*e* may be obtained by chamfering a corner between the second surface 610*b* and the side surface 610*c*.

A third angle AG3 may be an internal angle of the second inclined surface 610*e* with respect to the second surface 610*b*. A fourth angle AG4 may be an internal angle of the side surface 610*c* with respect to the second surface 610*b*. The third angle AG3 and the fourth angle AG4 may be different from each other. The third angle AG3 may have the same value as that of the first angle AG1, and the fourth angle AG4 may have the same value as that of the second angle AG2.

The third angle AG3 may be greater than the fourth angle AG4. The third angle AG3 may be an obtuse angle. The third angle AG3 may be in a range from about 120 degrees to about 150 degrees. In an embodiment, for example, the third angle AG3 may be about 135 degrees. The fourth angle AG4 may be about 90 degrees, however, this is merely exemplary. The third angle AG3 and the fourth angle AG4 should not be limited thereto or thereby.

A first hole portion 611a, a second hole portion 611b and a third hole portion 611c may be defined in each of the pattern holes 611-1. The third hole portion 611c may be defined by the second inclined surface 610e. Each of the first hole portion 611a, the second hole portion 611b and the third hole portion 611c may be a respective volume of a pattern hole 611-1 along a depth of the pattern hole 611-1 along the third direction DR3, where the three volume portions define an entirety of the pattern hole 611-1. Each pattern hole 611-1 may be defined by inner side surfaces of the plate 610-1 and inner surfaces of the cushion member 500 and the protective film 630, without being limited thereto.

A third width 611cT along the first direction DR1 of the third hole portion 611c may be equal to or greater than a first width 611aT along the first direction DR1 of the first hole portion 611a.

The third width 611cT may increase as a distance from the first hole portion 611a increases and as a distance to the cushion member 500 decreases.

Figure 7:
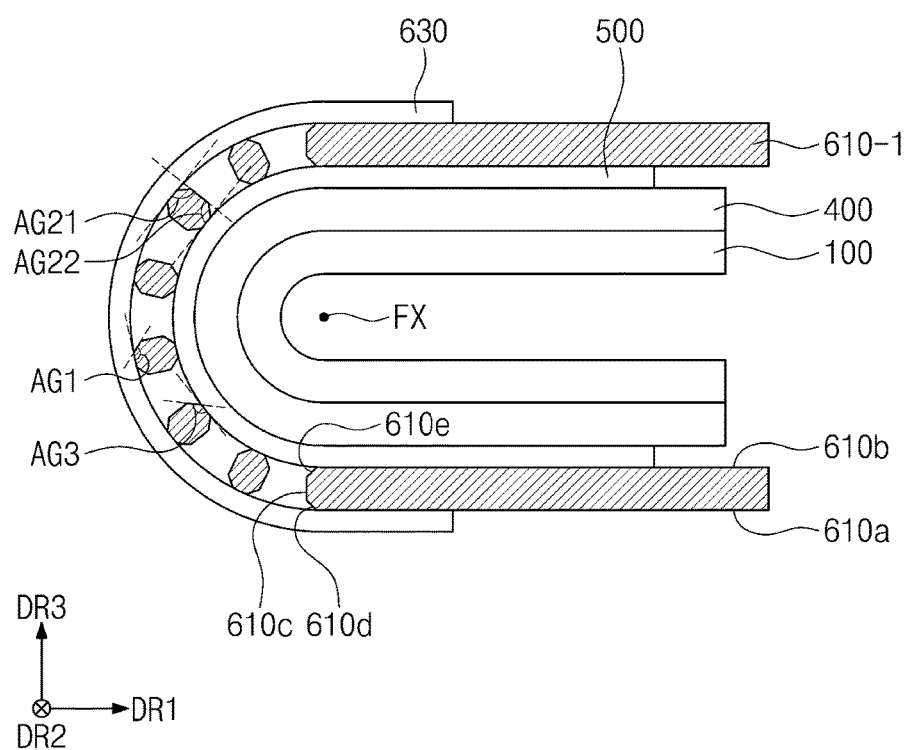
FIG. 7 is a cross-sectional view showing an embodiment of the display device in FIG. 6 which is folded.

FIG. 7 is a cross-sectional view showing an embodiment of the display device 1000 of FIG. 6 which is folded. In FIG. 7, the same reference numerals denote the same elements in FIG. 5, and thus, detailed descriptions of the same elements will be omitted.

Referring to FIG. 7, the display panel 100, the lower protective film 400, the cushion member 500, the plate 610-1 and the protective film 630 may be foldable together with each other about the folding axis FX.

A plate 610-1 of a comparative display device does not include the second inclined surface 610e and the side surface 610c extends to the second surface 610b of the plate 610-1. An intersection line may be obtained by extending the side surface 610c to meet the cushion member 500 at an intersection point. The intersection point may coincide with a corner of the plate 610-1 where the second surface 610b is connected to the side surface 610c. A tangent line relative to the cushion member 500 may be defined at the intersection point. An intersection surface of the cushion member 500 may be extended along the second direction DR2 at the corner. A second comparison angle AG22 between the intersection line of the side surface 610c and the tangent line may be an acute angle or a right angle. In an embodiment, for example, the second comparison angle AG22 may be about 90 degrees.

When the comparative display device (refer to FIG. 2) is folded, a third pressure may be applied to the cushion member 500 along the intersection surface such as being concentrated from the corner and along a planar area of the second surface 610b. The cushion member 500, the lower protective film 400 and the display panel 100 may be damaged by the third pressure, such as being torn by the third pressure, and the cushion member 500 which is torn may not protect the display panel 100 from impacts provided from a lower side thereof, and the display panel 100 may be damaged.

However, in one or more embodiment of the display device 1000, the plate 610-1 does include the second inclined surface 610e which extends to the second surface 610b. An intersection line may be obtained by extending the second inclined surface 610e to meet the cushion member 500 at an intersection point. The intersection point may coincide with a corner of the plate 610-1 where the second surface 610b is connected to a distal end of the second inclined surface 610e. A tangent line relative to the cushion member 500 may be defined at the intersection point. An intersection surface of the cushion member 500 may be extended along the second direction DR2 at the corner. An angle between the intersection line of the second inclined surface 610e and the tangent line may be the third angle AG3. The third angle AG3 may be an obtuse angle. The third angle AG3 may be in a range from about 120 degrees to about 150 degrees, for example, about 135 degrees.

When the display device 1000 (refer to FIG. 2) is folded, a fourth pressure may be applied to the cushion member 500 at the corner such as being distributed from the corner and along both a first planar area of the second inclined surface 610e and a second planar area of the second surface 610b. Since the total planar area (e.g., first planar area plus second planar area) where the plate 610-1 is in contact with the cushion member 500 increases, the fourth pressure may be smaller than the third pressure. The cushion member 500 may not be damaged by the fourth pressure. Accordingly, damage of the cushion member 500 and the display panel 100 which occurs due to the repetitive folding and unfolding of the display device 1000 (refer to FIG. 2) may be reduced or effectively prevented.

Although embodiments have been described, it is understood that the present disclosure should not be limited to these embodiments but various changes and modifications can be made by one ordinary skilled in the art within the spirit and scope of the invention as hereinafter claimed. Therefore, the disclosed subject matter should not be limited to any single embodiment described herein, and the scope of the invention shall be determined according to the attached claims.

What is claimed is:
1. A display device comprising:
a display panel comprising a folding area and a non-folding area which is adjacent to the folding area along a first direction;
a plate which faces the display panel, the plate defining:
a first surface and a second surface which is opposite to the first surface and closer to the display panel than the first surface,
inner side surfaces which face each other and define a pattern hole therebetween, the patten hole corresponding to the folding area, and
the inner side surfaces defined by a first plate portion of the plate and a second plate portion of the plate which are sequentially arranged along the first direction,
wherein each of the side surfaces respectively defined by the first plate portion and the second plate portion which are sequentially arranged, form two angles with respect to the first surface to define the pattern hole of the plate which is between the side surfaces along the first direction and corresponds to the folding area;
a lower adhesive layer which is directly on the first surface of the plate, the lower adhesive layer overlapping to the folding area of the display panel; and
a protective film which is under the lower adhesive layer and overlaps the pattern hole of the plate.

2. The display device of claim 1, wherein the each of the side surfaces comprises:
a first portion forming a first angle with respect to the first surface, and
a second portion which is further from the first surface than the first portion and forms a second angle with respect to the first surface, the first angle being greater than the second angle.

3. The display device of claim 1, wherein the pattern hole comprises:
a first width along the first direction, and
a second width along the first direction, the second width closer to the first surface than the first width,
wherein the first width is equal to or smaller than the second width.

4. The display device of claim 3, wherein the first width of the pattern hole is constant.

5. The display device of claim 4, wherein the first width of the pattern hole is in a range from about 100 micrometers to about 200 micrometers.

6. The display device of claim 3, wherein the second width of the pattern hole increases as a distance to the first surface decreases.

7. The display device of claim 2, wherein the first angle is in a range from about 120 degrees to about 150 degrees.

8. The display device of claim 1, wherein the plate faces both the folding area and the non-folding area and has a continuous shape.

9. The display device of claim 2, wherein the each of the side surfaces forms three angles with respect to the first surface to define the pattern hole of the plate which corresponds to the folding area.

10. The display device of claim 9, wherein the each of the side surfaces further comprises a third portion which is further from the first surface than the second portion and forms a third angle with respect to the second surface, the third angle being greater than the second angle and equal to the first angle.

11. The display device of claim 9, wherein the pattern hole comprises:
a first width, a second width and a third width in order from the first surface,
the first width increasing as a distance to the first surface decreases,
the second width which is constant, and
the third width increasing as a distance from the first surface increases.

12. The display device of claim 10, wherein
the third portion forms the third angle as an internal angle with the second surface, and
the third angle being is an obtuse angle.

13. The display device of claim 1, wherein the each of the side surfaces forms an internal angle with the first surface, the internal angle being an obtuse angle.

14. A display device comprising:
a display panel comprising a folding area at which the display panel is foldable;
a plate which faces the folding area of the display panel, the plate defining:
a first surface and a second surface which is opposite to the first surface;
an inner side surface extending from the first surface and forming two angles with respect to the first surface, the two angles defining a chamfered portion of the plate which is extended from the first surface and defines a pattern hole of the plate which corresponds to the folding area; and
the pattern hole comprising:
a first width which is constant and meets one of the first surface and the second surface, and
a second width which is closer to the first surface than the first width and different from the first width;
a lower adhesive layer directly on the first surface, the lower adhesive layer overlapping to the folding area of the display panel; and
a protective film which faces the display panel with the lower adhesive layer and the pattern hole of the plate therebetween.

15. The display device of claim 14, wherein the chamfered portion of the plate includes:
a first portion forming a first angle with respect to the first surface, and
a second portion which is further from the first surface than the first portion and forms a second angle with respect to the first surface, the second angle being smaller than the first angle.

16. The display device of claim 14, wherein the pattern hole further comprises the second width which increases as a distance to the first surface decreases.

17. The display device of claim 14, wherein the second width equal to or greater than the first width.

18. The display device of claim 14, wherein
the chamfered portion of the plate forms an internal angle with the first surface of the plate which is an obtuse angle.

* * * * *